April 2, 1929. E. E. McGREW Re. 17,253
AWNING SUPPORT
Original Filed Dec. 6, 1926
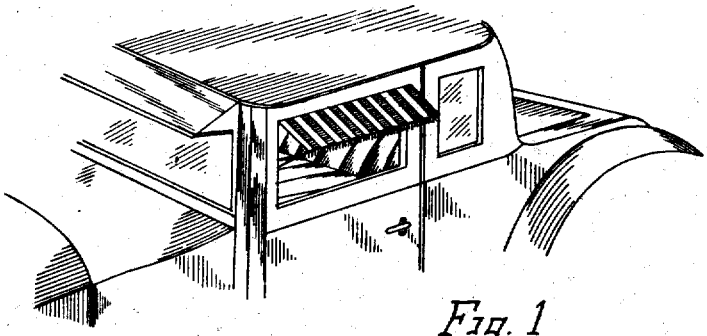
Fig. 1
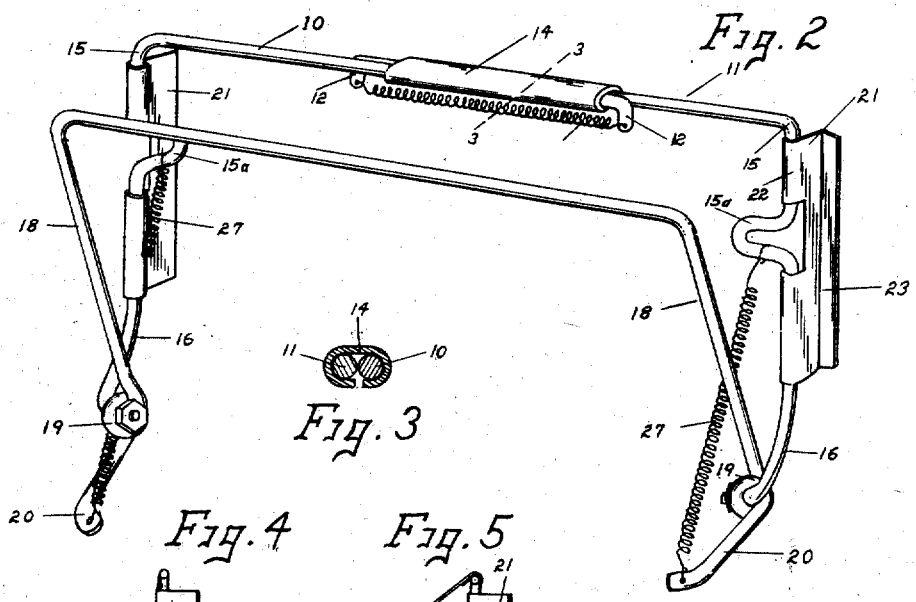
Fig. 2
Fig. 3
Fig. 4
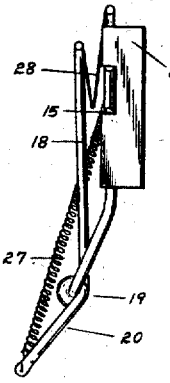
Fig. 5
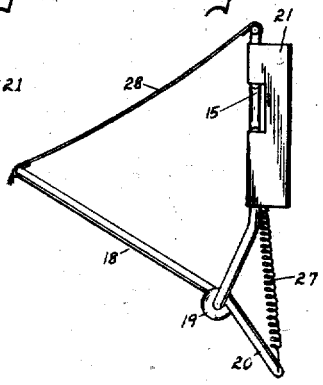
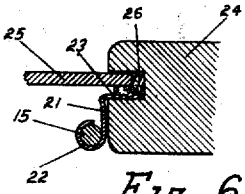
Fig. 6
Inventor
E. E. McGREW
By Emil F. Lange
Attorney Reissued Apr. 2, 1929. Re. 17,253

UNITED STATES PATENT OFFICE.

EARL E. McGREW, OF LINCOLN, NEBRASKA, ASSIGNOR TO McGREW MACHINE COMPANY, OF LINCOLN, NEBRASKA, A CORPORATION OF NEBRASKA.

AWNING SUPPORT.

Original No. 1,621,941, dated March 22, 1927, Serial No. 152,905, filed December 6, 1926. Application for reissue filed November 13, 1928. Serial No. 319,099.

My invention relates to awnings which are adapted especially for use in the windows of automobiles. The present invention relates more particularly to supports or frames for the awning proper and it has three primary objects in view:

The provision of a frame which is adapted to be removably inserted in a window opening of a closed automobile in such a manner as to avoid entirely the groove in which the window is slidably mounted so as not to interfere with the opening and the closing of the window while the awning is in place.

The provision of a frame of the non-roll type and having a support and a spreader pivotally connected together and supporting the awning between them, with a spring in dead center relation so that the spring will hold the awning under tension when open and so that it will positively hold the parts in closed position when the awning is folded, and The provision of means for maintaining the awning support in rigid condition and for preventing sagging in the frame, thereby increasing the effectiveness and the attractive appearance of the awning and increasing its life.

The secondary objects will be mentioned in the following description.

Referring now to the drawings,

Figure 1 is an illustration of a portion of an automobile with my awning in place.

Figure 2 is a view in perspective of the awning frame.

Figure 3 is a sectional view on the line 3—3 of Figure 2.

Figure 4 is a view in side elevation showing the awning closed.

Figure 5 is a view in side elevation showing the parts of the awning frame in the open position.

Figure 6 is a view in horizontal section through the window and window frame and showing particularly the points of attachment of my awning frame.

The frame includes a two part bail-like structure which is adapted to be secured in the window opening and to support the upper edge of the awning. The two parts 10 and 11 are complementary and they are slidably interconnected with resilient means for keeping them spread apart. The inner end portions are downturned at 12 and a spring 13 is secured at its ends to the downturned ends 12. A sheath 14 surrounds portions of the parts 10 and 11, the sheath being secured by welting to the part 11, leaving the part 10 free to slide lengthwise in the sheath. The sheath serves to hold the parts 10 and 11 in perfect parallelism during the slidable movements. Both parts 10 and 11 have downwardly turned parts 15, the parts 15 being vertical and being perpendicular to the parts 10 and 11. At their lower end portions the arms 15 are bent toward each other and outwardly with respect to their positions in the car, these portions being designated by the numeral 16. At their extreme lower ends the parts 16 are bent inwardly and horizontally so as to support the bail which serves as a spreader for the awning.

The bail 17 is provided with arms 18 and with loops 19 for engaging the inwardly bent end portions of the arms 16. Beyond the loops 19 the spreader bail terminates in arms 20 which are bent outwardly and toward each other. It should be noted that the spreader bail is made of resilient material and that the tendency of the lower ends is to spread apart and to thus force the arms 16 apart. The arms 10 and 11 are slidable on each other so that the arms 15 may be forced toward each other so as to fit the frame into the opening, the arms 15 being then held in their spread apart relation by means of the spring 13 acting at their upper ends and by means of the spring arms 18 acting at their lower ends.

The arms 15 are each provided with a strip of angle steel 21, the edge of the strip 21 being rolled to surround its arm 15 and being welded thereto so as to prevent any possible displacement. Each strip 21 is provided also with a narrow outturned lip 23. The purpose of this construction will be apparent from an inspection of Figure 6 and it should be kept in mind that one of my main purposes is to avoid the groove in which the window slides so as to avoid any interference of the awning frame with the window. In Figure 6 the side of the window frame is shown at 24 and the window itself is shown at 25. The window frame 24 is provided with a channel which is filled with felt 26 or with some similar padding material. The felt is provided with a groove in which the window slides. The lip 23 is relatively thin and narrow and it is adapted to enter the channel of the window frame at the outer edge of the felt packing 26. By forcing the arms 15 toward each other it is possible to position the entire device in the window opening with both lips 23 in the position indicated in Figure 6. The main holding means for the frame is the spring 13 acting in conjunction with a spring 18 to hold the two arms 15 tightly pressed against the sides of the window frame. The lips 23 supplement this holding action and prevent accidental displacement of the frame. For convenience in removing the frame from the window opening, the arms 15 are provided with inwardly projecting portions 15[a] of U form so that a finger may be inserted to force the arms 15 toward each other, the strips 21 being cut away at the projections 15[a].

The frame is constructed so that it may be easily opened or closed. For this purpose springs 27 are secured at their opposite ends to the projections 15[a] and to the arms 20 at the extremities thereof. It will be evident from inspection of Figures 4 and 5 that the points of attachment of the ends of the spring 27 are out of alignment with the pivotal point of the supporting and spreading bail and that the spring must move across the pivotal point when the awning is opened or closed. In other words, the parts are in dead center relation so that only a slight impulse being required for either opening or closing the awning, the movement being completed under the action of the springs 27 which then hold the awning taut when open or hold the parts in folded relation when the awning is closed.

The awning frame which I have shown and described is adapted to be secured in very rigid relation in a window frame without entering the groove in which the window slides. Conditions frequently make it desirable that the occupants of an automobile be protected from the glare of the sun and from the wind at the same time and for this reason it is absolutely necessary that the awning frame be applied to the window frame in such a way as to entirely avoid the window groove. The device as above described accomplishes this purpose by the use of a lip which enters a groove other than the groove in which the window slides.

Having thus described my invention in such full, clear, and exact terms that its construction and operation will be readily understood by others skilled in the art to which it pertains, what I claim as new and desire to secure by Letters Patent of the United States is:

1. An awning frame which is adapted to be compressed between the side members of a window opening, said awning frame including two horizontal members which are in overlapping relation at their inner end portions and which are slidable on each other, and means secured to one of said members for maintaining the sliding movements of both of said members in straight lines.

2. An awning frame which is adapted to be compressed between the side members of a window opening, said awning frame including two horizontal members which are in overlapping relation at their inner end portions, means on said two members for yieldably forcing the outer ends thereof outwardly in the direction of their length, and means secured to one of said members and engaging the other of said members for maintaining the sliding movements of both of said members in straight lines.

3. An awning frame which is adapted to be compressed between the sides of a window opening, said awning frame including two horizontal members which are in overlapping relation at their inner end portions and which are slidable on each other, and an elongated sheath surrounding the inner end portions of both of said members for maintaining the sliding movements thereof in straight lines and for holding said two members in parallel relation.

4. An awning frame which is adapted to be compressed between the sides of a window opening, said awning frame including two horizontal frame members in parallel and overlapping relation at their inner end portions and which are slidable on each other, means on said two members for yieldably forcing the outer ends thereof outwardly in the direction of their length, and an elongated sheath surrounding both of said members for maintaining the sliding movements thereof in straight lines and for holding said two members in parallel relation.

5. An awning frame which is adapted to be compressed between the side members of a window opening, said awning frame including two horizontal members which are in overlapping relation at their inner end portions, each of said members having a member projecting angularly from the inner extremity of the member, an expansible resilient member connecting said two angularly projecting members for normally forcing the outer ends of said two horizontal members outwardly, and means on said two horizontal members for maintaining them in parallel relation, said last named means being engageable with said angularly projecting members for limiting the outward sliding movements of said horizontal members.

6. An awning frame which is adapted to be compressed between the side members of a window opening, said awning frame including a pair of horizontal members which are in overlapping and parallel relation at their inner end portions and which are slidable on each other, and downwardly projecting members secured to said horizontal members at the outer extremities thereof, said downwardly projecting members having outer plane surfaces which are adapted for contact with the vertical side members of the window opening outwardly and away from the grooves in which the window slides.

7. An awning frame which is adapted to be compressed between the side members of a window opening, said awning frame including a pair of horizontal members which are in overlapping and parallel relation at their inner end portions and which are slidable on each other, downwardly projecting members secured to said horizontal members at the outer extremities thereof, said downwardly projecting members having outer plane surfaces which are adapted for contact with the vertical side members of the window opening outwardly and away from the grooves in which the window slides, and outwardly projecting relatively thin lips on said downwardly projecting members, said lips being adapted to engage in grooves at the sides of the window frame other than the grooves in which the window slides.

8. An awning frame which is adapted to be compressed between the side members of a window opening, said awning frame including a pair of horizontal members which are in overlapping and parallel relation at their inner end portions and which are slidable on each other, downwardly projecting members secured to said horizontal members at the outer extremities thereof, said downwardly projecting members having outer plane surfaces which are adapted for contact with the vertical side members of the window opening outwardly and away from the grooves in which the window slides, and means on said downwardly projecting members whereby said members may be grasped by the fingers to force them toward each other.

9. An awning frame including two members for respectively supporting an awning at its opposite edges, said two members being pivotally connected together, and an expansible resilient member secured to both of said two members, said expansible resilient member being in dead center relation with respect to the pivotal connection of said pair of members.

10. An awning frame comprising a supporting bail and a bracing bail, the said two bails having their respective arms pivotally connected with each other, an extension projecting from said bracing bail beyond the pivot with the supporting bail, said extension being offset so as to be in dead center relation with said supporting bail, and an expansible resilient connection between said extension and said supporting bail.

11. An awning frame comprising a supporting bail and a bracing bail, the said two bails having their arms pivotally connected with each other, an arm of said supporting bail being provided with a portion projecting inwardly beyond the edge of the window frame, an extension projecting from an arm of said bracing bail beyond the pivot thereof, said extension being offset and in dead center relation with the arm of said supporting bail and an extensible resilient connection between the inwardly projecting portion of the arm of said supporting bail and said extension.

12. An awning frame comprising a supporting bail and a bracing bail, the middle portions of said two bails being adapted to support an awning therebetween, inwardly projecting U-shaped portions on the arms of said supporting bail, the arms of said bracing bail being looped at their free extremities, inwardly projecting portions at the free extremities of said supporting bail, said last named inwardly projecting portions being seated in the loops of said bracing bail to pivotally connect the said two bails, and an extension on each of the arms of said bracing bail and projecting beyond the pivot thereof, said extensions being outwardly offset with relation to the arms of said supporting bail and in dead center relation therewith, and expansible springs connected at their extremities to said U-shaped portions and to said extensions.

13. In an expansible automobile awning frame of the type adapted to be mounted between the jambs of a window frame and having window jamb engaging members connected at their upper ends to the expansible portions of the awning frame, a resilient bail connected at its free ends to said jamb engaging members for urging the lower ends of the members outwardly to bind against the jambs of the window, and means for releasably holding the bail in position on the members.

14. In an expansible automobile awning frame of the type adapted to be mounted between the jambs of a window frame and having window jamb engaging members connected at their upper ends to the expansible portions of the frame, a resilient bail having its free ends pivotally connected to the lower ends of said members and being of a length to yieldingly urge the lower ends of said members outwardly for binding engagement with the window jamb.

15. In an expansible automobile awning frame of the type adapted to be mounted between the jambs of a window frame and having window jamb engaging members connected at their upper ends to the expansible portions of the frame, a resilient bail having its free ends pivotally connected to the lower ends of said members and being of a length to yieldingly urge the lower ends of said members outwardly for binding engagement with the window jamb, said bail at its middle portion adapted for attachment to the lower edge of the awning cover, and means for releasably holding the bail in position about its pivotal connections with said jamb engaging plates.

16. An automobile awning frame including side members adapted to engage the window jambs of an automobile window, each of said side members having a thin lip projecting outwardly therefrom for entering slits in the window jambs, and a spreader member connecting said side members for urging said side members away from each other and into engagement with the window jambs, said spreader member being adapted to support one edge of an awning web.

17. In an expansible automobile awning frame of the type adapted to be mounted between the panels of a window frame and having side members with out-turned lips for engagement in the slits adjacent the felt and connected at their upper ends to the expansible portion of the awning frame, a resilient bail connected at its free ends to said side members for urging the lower ends thereof outwardly to hold the lips in said slits of the window, and means for holding the bail in raised and lowered positions.

18. In an expansible automobile awning frame of the type adapted to be mounted between the jambs of a window frame, side members connected at their upper ends to the expansible portions of the frame and having outwardly projecting tongues adapted to enter the slits adjacent the felt in the jamb, and a resilient bail having its free end portions connected to the lower portions of the side members to yieldingly urge the latter outwardly and hold the tongues in the slits.

In testimony whereof I affix my signature.

EARL E. McGREW.